United States Patent [19]

Freber

[11] Patent Number: 4,485,972
[45] Date of Patent: Dec. 4, 1984

[54] BURNER FOR COOKING GRILLS

[75] Inventor: Elmer C. Freber, St. Louis, Mo.

[73] Assignee: Marquette Tool and Die Company, St. Louis, Mo.

[21] Appl. No.: 311,785

[22] Filed: Oct. 15, 1981

[51] Int. Cl.³ .............................................. F23D 21/00
[52] U.S. Cl. .............................. 239/553.3; 126/39 R; 239/600; 431/354
[58] Field of Search ...................... 239/553, 553.5, 600, 239/251; 126/25 R, 41 R, 39 E, 39 R; 285/332; 431/350, 354, 278

[56] References Cited

U.S. PATENT DOCUMENTS

| | | | |
|---|---|---|---|
| 1,677,486 | 7/1928 | Nelson | 239/251 |
| 2,457,908 | 1/1949 | Meyerhoefer | 285/332 X |
| 3,399,024 | 8/1968 | Branson | 239/553 X |
| 3,407,023 | 10/1968 | Hirschberg et al. | 239/600 X |
| 3,630,447 | 12/1971 | Smart et al. | 239/600 X |
| 4,014,469 | 3/1977 | Sato | 239/489 X |
| 4,267,816 | 5/1981 | Koziol | 126/41 R |

*Primary Examiner*—Andres Kashnikow
*Attorney, Agent, or Firm*—Gravely, Lieder & Woodruff

[57] ABSTRACT

A burner for a cooking grill has upper and lower sections which are joined together to enclose a plenum for containing a combustible gas. The lower section has a peripheral wall containing apertures which enable the gas in the plenum to escape for burning outside of the burner. In addition, the lower section has a bottom wall provided with a hole, while the top section has a top wall provided with a recess located opposite to the hole. A short inlet tube, to which the combustible gas is supplied, extends through the hole in the bottom wall, and within the plenum segments of the tube are bent outwardly away from the tube axis in the form of tabs which overlie the inwardly presented surface of the bottom wall. These segments leave the tube with openings that permit gas to flow from the tube to the plenum. The remaining tube segments of the inlet tube extend into the recess of the top section, so that the tube is captured firmly between the two burner sections, and these segments are presented toward the plenum apertures which are closest to the tube to prevent an excessive amount of gas from flowing to those apertures.

14 Claims, 9 Drawing Figures

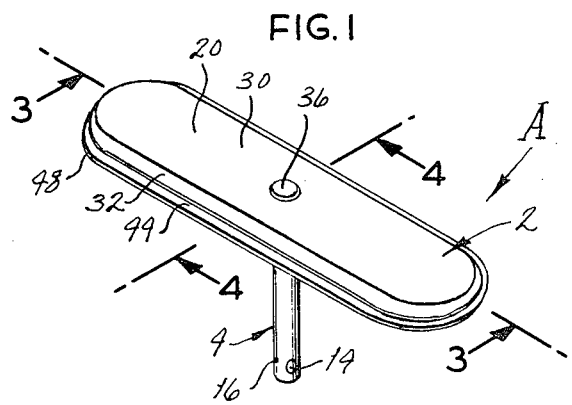
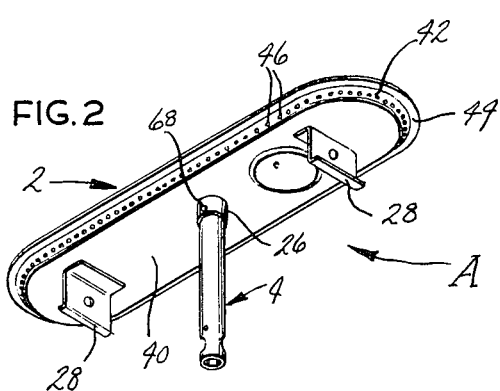
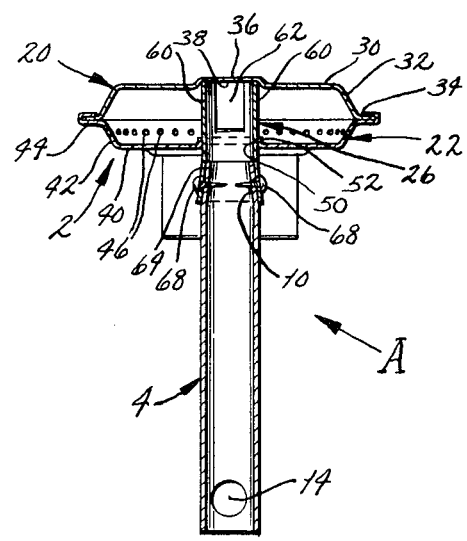
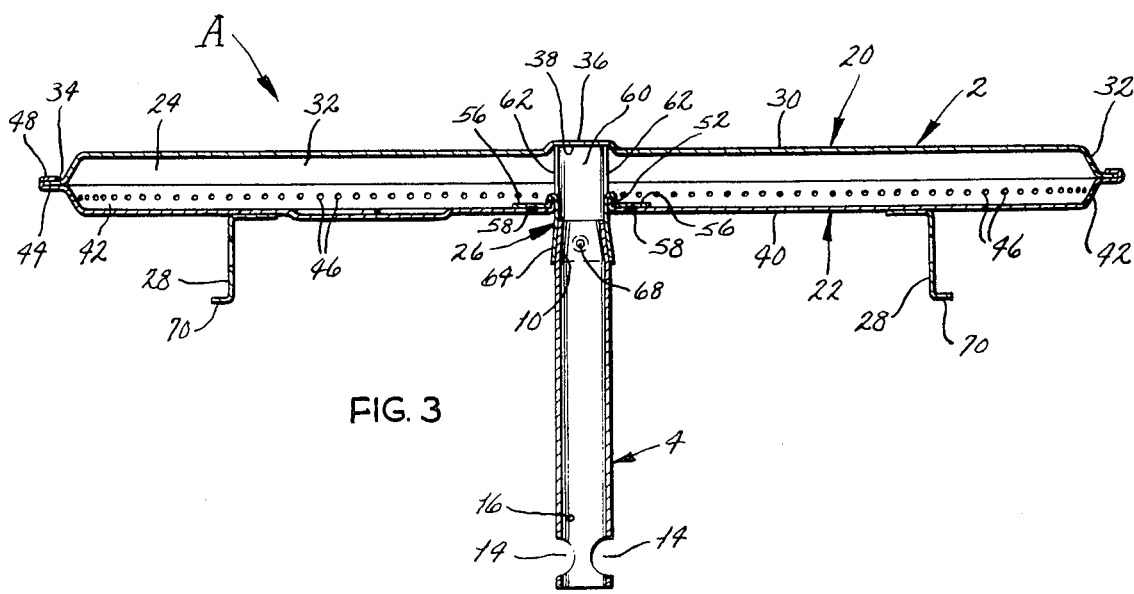

BURNER FOR COOKING GRILLS

BACKGROUND OF THE INVENTION

This invention relates in general to gas burners, and more particularly, to burners for gas-fired cooking grills.

Gas-fired cooking grills have become quite popular for outdoor cooking, particularly in residential areas, and to a large measure have replaced the traditional charcoal grill. The typical gas-fired grill has a relatively deep housing that is mounted upon a pedestal. A grate extends over the upper end of the housing for supporting the food that is to be cooked, and usually a lid is hinged to the housing to completely enclose the grate. This enables the grill to be used as an oven and further protects components within the housing during periods of nonuse. One of those components is a burner to which a combustible gas is supplied for producing a flame below the grate. Actually, the burner is part of an assembly that in addition to the actual burner, includes an upright venturi tube that leads into the burner. This tube in the typical grill extends down into the pedestal where it fits over an orifice from which a regulated supply of a gaseous fuel, such as natural gas or propane gas, is discharged. Within the venturi tube the gaseous fuel mixes with air to form a combustible mixture that ignites upon issuing from the apertures in the burner itself.

Initially, the burners for gas grills were made almost exclusively from cast iron. However, iron casting has become quite expensive. Moreover, the intense heat within a grill housing will cause conventional cast iron to corrode, producing a scale that clogs the burner apertures in some places and leaves them too large in others. This of course distorts the flame such that it is considerably more intense in some regions than in others.

These disadvantages led grill manufacturers to substitute stamped burners for cast burners. The typical stamped burner is formed entirely from a metal that will withstand the heat without oxidizing, and usually includes two stamped sections which are joined together so as to create a narrow chamber or plenum between them. One or both of the sections has the burner apertures, and the lower section is connected to a venturi tube that fits down into the pedestal of the burner to the control valve where the tube directs gas from the valve to the burner plenum. To facilitate packaging the burner and the venturi tube are usually supplied as separate components, the tube having at its upper end a flange that is subsequently secured by means of sheet metal screws to the lower section of the burner. Normally, an asbestos gasket is interposed between the flange and the burner. Also in the region where the venturi tube opens into the burner plenum, the burner is provided with separate baffles to more evenly distribute the gas to burner apertures, and thereby prevent an excessive amount of gas from flowing to the apertures closest to the venturi tube. All of this contributes significantly to the cost of manufacturing stamped burners.

Consideration has been given to joining the venturi tube and burner into a single unit, but this presents packaging and inventory problems. As to the former, a burner having a long venturi tube projected from it is certainly more difficult to pack and ship than a burner and a detached venturi tube. As to the latter, one basic burner configuration is often used with a variety of venturi tube configurations to accommodate grills of different size and manufacture. Instead of stocking one type of burner and a variety of venturi tubes, as is possible when the two can be detached from one another, one must instead stock a separate burner assembly for each venturi tub configuration.

SUMMARY OF THE INVENTION

One of the principal objects of the present invention is to provide an improved burner and burner assembly for gas grills with the burner being formed primarily from sheet metal stampings. Another object is to provide a burner assembly including a burner and a mixer tube which are initially detached, but may easily be joined together for installation in a gas grill. A further object is to provide a burner of the type stated which has a short inlet tube that mates with the mixer tube and further serves as a baffle for insuring that the combustible mixture is distributed generally uniformly to the burner apertures. An additional object is to provide a burner composed essentially of two sections which are stampings that are joined together to enclose a plenum and an inlet tube which is captured between the two sections, yet projects beyond one of them. Still another object is to provide a burner and burner assembly that are durable, simple in construction, and is economical to manufacture. These and other objects and advantages will become apparent hereinafter.

The present invention resides in a burner including walls that enclose a plenum for containing a combustible gas. One of the walls has apertures for allowing the gas to escape where it can be burned. The burner also includes an inlet tube through which the gas is supplied to the plenum, and this tube projects into the plenum where it is cut away to provide an opening. The invention also resides in a burner assembly that further includes a mixer tube which connects with the burner tube. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur —

FIG. 1 is a perspective view of a burner assembly constructed in accordance with and embodying the present invention, the view showing primarily the upper surfaces of the assembly;

FIG. 2 is another perspective view of the burner assembly showing primarily its lower surfaces;

FIG. 3 is a full sectional view taken along line 3—3 of FIG. 1;

FIG. 4 is a full sectional view taken along line 4—4 of FIG. 1;

DETAILED DESCRIPTION

Figure 5:
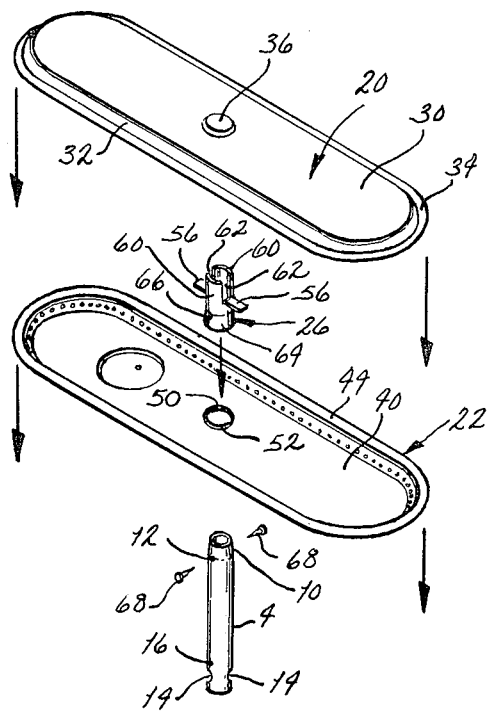
FIG. 5 is an exploded perspective view of the burner assembly prior to assembly.
Figure 8:
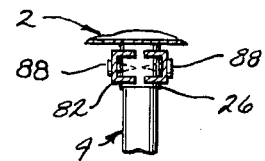
FIG. 8 is a sectional view taken along line 8—8 of FIG. 7.
Figure 9:
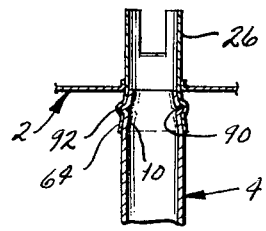
FIG. 9 is a full sectional view of a modified connection between the stub tube and the mixer tube.

Referring now to the drawings, a burner assembly A (FIGS. 1 and 2) that is suitable for use with the typical outdoor cooking grill includes two basic components, namely a burner 2 and a mixer tube 4 that fits into the burner 2 and in use projects from it, usually a substantial distance. The tube 4 not only conducts a combustible gas to the burner 2, but further serves as a chamber in which a gaseous fuel, such as natural gas or propane gas, is mixed with air to form the combustible gas. The combustible gas flows into the burner 2 from which it issues, it being burned along the periphery of the burner 2 for heating the interior of the grill as well as grates within the grill. Initially, the mixer tube 4 is detached from the burner 2 to provide a convenient carrying package. However, the upper end of the tube 4 mates nicely in a tapered fit with the burner 2 and the two are easily secured together such that the overall burner assembly A is rigid throughout. While the burner 2 is relatively flat and is designed to lie within the interior of a housing for an outdoor grill, the tube 4 is cylindrical and is designed to extend around an orifice from which the gaseous fuel discharges. Both the burner 2 and the mixer tube 4 should be formed in their entireties from a material that resists oxidation and other types of corrosion. Aluminized steel is well suited for the purpose, and stainless steel is even better suited.

Considering the mixer tube 4 first, it is nothing more than a piece of cylindrical tubing which is at its upper end swaged down to produce a tapered portion 10 (FIGS. 3–5), although the taper of the portion 10 is not very pronounced. Within the tapered portion 10 are two screw holes 12 that are aligned and located 180° apart. At its lower end, the tube 4 has two rather large air holes 14 that are also aligned and located 180° apart, these holes being designed to admit air into the tube 4 as a gaseous fuel is introduced into its open lower end. In this regard, the open lower end of the tube 4 is large enough to fit around gas orifice that is usually located on a control valve. As the gaseous fuel rises through the tube, it creates a venturi effect, drawing air in through large holes 14. The air and fuel thereafter mix together within the tube 10 to form a combustible mixture or gas. The tapered portion 10 at the upper end of the tube 4, on the other hand, is designed to mate with the burner 2 so that the combustible gas flows out of the open upper end and into the interior of the burner 2. Slightly above the large air holes 14 are two more screw holes 16, these holes being offset angularly with respect to the air holes 14 and aligned at 180° with respect to each other. Usually the tube 4 is perfectly straight, although it may be curved to accommodate the housing or pedestal of a particular grill. A helix may be incorporated into the tube 4 to create better flow and mixture.

The burner 2, which is generally flat, includes (FIGS. 3–5) an upper section 20 and a lower section 22 which are joined together along the peripheries to enclose a plenum 24. In addition, the burner 2 has a stub tube 26 which projects outwardly from the lower section 22 where the tube 26 receives the upper end of the mixer tube 4. The stub tube 26 opens into the plenum 24, and serves as an inlet for directing the combustible gas from the tube 4 into the plenum 24. Completing the burner 2 are support brackets 28 which project downwardly from the lower section 22 to support the main body of the burner 2 in an elevated position above the bottom wall of a grill housing. While the stub tube 26 is formed from tube stock of the same diameter and metal as that from which the mixer tube 4 is formed, the upper and lower burner sections 20 and 22 and the brackets 26 are all stamped from sheet metal stock, but the metal is the same.

With respect to the upper section (FIGS. 1 and 3–5), it is a unitary stamping having a flat top wall 30 that merges into a peripheral wall 32, which in turn merges into an outwardly directed flange 34. Both the top wall 30 and the flange 34 lie in horizontal planes whereas, the peripheral wall 32 is inclined downwardly and outwardly from the top wall 30 to the flange 34. The sides of the peripheral wall 32 are straight while the ends are arcuate, and the corresponding portions of the flange 34 assume like configurations. At its center, directly opposite from the stub tube 20, the top wall 30 is provided with a circular boss 36 which forms a shallow recess 38 on the inwardly or downwardly presented surface of the top wall 30. The recess 36 receives the upper end of the stub tube 26.

The lower section 22 (FIGS. 2–5) of the burner 2 is quite similar to the upper section 20 and includes a bottom wall 40 which merges into a peripheral wall 42 which in turn merges into a flange 44. The bottom wall is the same size and configuration as the top wall 30 on the upper section 20 and is located directly beneath, yet is spaced slightly from the top wall 30. Indeed, the space between the top and bottom walls 30 and 40 constitutes the plenum 24. The peripheral wall 42 turns upwardly from the bottom wall 40 at an oblique angle and has straight sides and arcuate ends that correspond to the straight sides and arcuate ends of the peripheral wall 32 of the upper section 20. However, in contrast to the peripheral wall of the upper section 20, which is solid throughout, the peripheral wall 42 of the lower section 22 has a series of small apertures 46 arranged in a single row at equal intervals. The flange 44 of the lower section 22 is the same size and shape as the flange 34 of the upper section 20 and indeed the two flanges 34 and 44 are against each other around the entire periphery of the burner 2. Moreover, the flange 44 of the lower section 22 is provided with a lip 48 which is doubled back over its own flange 44 and the flange 34 of the upper section 20 as well (FIGS. 3 and 4) so as to clamp the two sections 20 and 22 tightly together and provide a seal that is sufficiently effective to prevent the combustible gas from escaping from the plenum 24 along the flanges 34 and 44. Prior to assembly of the burner 2 the lip 48 is in an upright or perpendicular disposition with respect to its flange 44 (FIG. 5). However, once the stub tube 26 and the upper section 20 are in place on the lower section 22, the lip 48 is deformed inwardly and downwardly in a hemming operation to clamp the two flanges 34 and 44 together, which of course holds the upper and lower burner sections 20 and 22 together.

While the top wall 30 has the recess 38 centered in it, the bottom wall 40 has a circular hole 50 that is centered within it and is therefore located directly beneath the recess 38. The hole 50 and recess 38 furthermore have the same diameter which is equal to the outside diameter of the stub tube 4, and indeed the stub tube 26 projects through the hole 50 and terminates within the reces 38. The bottom wall 40 is turned upwardly along the margin of the hole 50 to provide a slight rim 52 (FIG. 4).

The stub tube 26, which is made from the same tube stock as the mixer tube 4, fits through the circular hole 50 and rim 52 and projects downwardly away from the bottom wall 40 as well as upwardly into the plenum 24. Indeed, the stub tube 26 projects completely through the plenum 24, for its upper end is received in the recess 38 that opens downwardly from the top wall 30 of the upper burner section 20 (FIGS. 3 and 4). Actually, the entire tube 26 does not extend into the recess 38, for the portion of the tube 26 above the rim 52 that surrounds the hole 50 is lanced to create two tabs 56 which are bent outwardly and downwardly over the rim 52 and extend laterally along the upper surface of the bottom wall 40 for the lower burner section 22. The tabs 56 are attached to the bottom wall 40, along spot welds 58, thus securing the stub tube 26 firmly to the lower section 22. The tabs 56 are located at 180° with respect to each other and lie along the longitudinal axis of the lower burner section 22. They leave the stub tube 26 with two arcuate segments 60 that extend all the way from the rim 52 to the recess 38 and two openings 60 which likewise extend substantially the full height of the plenum 24. The openings 62, which are located 180° from each other, are directed toward the arcuate ends of the burner sections 20 and 22, and admit the combustible gas to the plenum 24. The arcuate segments 60, on the other hand, face the sides of burner sections 20 and 22 and prevent the gas from flowing directly to the nearby apertures 46 in the peripheral wall 42 of the lower section 22. In effect, the arcuate segments 60 of the stub tube 26 function as baffles which prevent the combustible gas from flowing directly to the apertures 46 that are closest to the tube 26, and this affords a more uniform distribution of gas within the plenum 24. The two arcuate segments 60 and resultant tabs 56, are located 180° from each other. However, they may be placed anywhere along the circumference of that portion of the tube 26, that is within the plenum 24, to best direct the combustible gas in an even distribution to any of various configurations of apertures 46 and plenum shapes that may be desired by the manufacturer. Moreover, the configuration and number of openings 62, arcuate segments 60, and tabs 56, may be altered to direct combustible gas to selective areas of the plenum 24 to insure even flame propagation, so long as the assembly and attachment methods remain similar.

The axial dimension of the arcuate segments 60 is slightly greater than that required to reach and fit into the recess 38 when the upper section 22 is placed over the lower section 20 during the assembly of the burner 2, and therefore the flange 34 of the upper section must be forced downwardly against the flange 44 of the lower section 22 before the lip 48 on the flange 44 is hemmed over the flange 34. As a consequence, the top wall 30 on the upper section 20 bows slightly upwardly, but the deformation is well below the yield strength of the material. Thus the tabs 56 and the arcuate segments 60 are clamped tightly between the top and bottom walls 30 and 40 of the upper and lower burner sections 20 and 22, respectively, and this alone is enough to secure the stub tube 26 firmly in place, notwithstanding the spot welds 58 at the tabs 56.

Below the bottom wall 40, the stub tube 26 is swaged outwardly to provide it with a tapered portion 64 (FIGS. 3 and 4), the inside taper of which corresponds to that of the outside taper on the tapered portion 10 of the mixer tube 4. Moreover, the tapered portion 64 has two holes 66 (FIG. 5) which are aligned 180° apart and are somewhat larger than the screw holes 16 in the tapered portion 10 of the mixer tube 4.

The tapered portion 10 of the mixer tube 4 fits snugly within the tapered portion 64 of the stub tube 26, and when so fitted and turned to the proper angular position, the screw holes 12 in the portion 10 will align with the larger holes 66 in the portion 64. The mixer tube 4 and stub tube 26 are secured firmly together by the snug fit at the tapered surfaces on the portions 10 and 64 and by sheet metal screws 68 (FIG. 4) that fit into the holes 66 of the stub tube 26 and thread into the screw holes 12 in the mixer tube 4.

The support brackets 28 (FIGS. 2 and 3) have upper and lower flanges 70, the former of which are attached to the bottom wall 40 by spot welds. Two brackets 28 are employed, there being a single bracket near each end of the burner 2.

The various parts for the burner assembly A are manufactured in essentially the same configuration that they appear in the final product, with slight exceptions as to the lower burner section 22 and the stub tube 26. Prior to the assembly of the burner 2 (FIG. 5) the lower burner section 22 has its peripheral lip 48 projected upwardly, that is perpendicular to its flange 44. The stub tube 26, on the other hand, is lanced to provide tabs 56 which are bent outwardly, but they do not assume the precise configuration of the tabs 56 in the stub tube 26 of the assembled burner 2. Moreover, that portion of the stub tube 26 which projects outwardly from the bottom wall 40 is cylindrical, it having the same diameter as the tube stock from which the stub tube 26 is formed.

To assemble the burner, the stub tube 26 is inserted through the hole 50 in the bottom wall 40 until the tabs 56 on it come against the rim 52 that surrounds the hole 50. Thereupon, the lower burner section 22 is placed in a die which upon closing drives the stub tube 26 to the proper axial position within the hole 50 and further deforms the tabs 56 over the rim 52 and against the flat upper surface of the bottom wall 40. The die further swages the outwardly projecting portion of the stub tube 26 into a slightly tapered configuration, causing that portion to transform into the tapered portion 64 of the stub tube 26. Then the brackets 28 are welded at their upper flanges 70 to the bottom wall 40 of the lower burner section 22. Next the tabs 56 on the stub tube 26 are spot welded to the bottom wall 40 of the lower burner section 22.

After the stub tube 26 is welded to the lower burner section 22, the upper burner section 20 is placed over the lower section, and inasmuch as the flange 34 on the upper section 20 is the same size as the flange 44 on the lower section 22, it will drop down through the area circumscribed by the lip 48 on the lower section 22 and overlie the flange 44 of the lower section 22. However, the top wall 30, or more accurately the recess 38 in the top wall 30, will come against the arcuate segments 60 of the tube 26 before the flanges 44 on the upper and lower sections 20 and 22 come against each other.

With the top section 20 so disposed over the lower section 22, the two sections 20 and 22 are forced together, with the force being applied to the upper section 20 near the periphery of its top wall 30, but not at the center of that wall. As a consequence, the top wall 30 bows slightly upwardly, thereby capturing the arcuate segments 60 snugly between the recess 38 in the top wall 30 and the circular hole 50 in the bottom wall 40. With the upper section 20 so positioned, the lip 48 on the lower section 22 is turned over the flange 34 on the upper section 20 in a hemming operation, and this secures the two sections 20 and 22 together and completes the burner 2.

The burner 2 and the mixer tube 4 are shipped with the latter being detached from the former so as to facilitate packaging and inventory control as well.

The procedure by which a manufacturer of gas grills or an individual who is replacing a defective grill installs the burner assembly A merely involves fitting the tapered portion 10 of the mixer tube 4 into the tapered portion 64 of the stub tube 26 and then twisting the one with respect to the other until the screw holes 12 in the mixer tube 4 align with the holes 66 in the stub tube 26. At this point, the sheet metal screws 68 are inserted through the holes 66 in the stub tube 26 and threaded into the holes 12 in the mixer tube 4. Thereafter, the burner assembly A is lowered into the grill housing until the mixer tube 4 fits over the orifice at the control valve and the support brackets 28 come to rest on the bottom wall of the grill housing.

In use, the gaseous fuel is discharged as a fine jet into the bottom of the mixer tube 4 such that the fuel flows axially upwardly through the tube 4. This flow creates a pressure reduction which draws air into the mixer tube 4 from the air holes 14. The gaseous fuel and the air mix together within the mixer tube 4 to create a combustible gas, and this gas enters the burner 2 at the stub tube 26. The gas leaves the stub tube 4 through the openings 62 in that tube and flows into the plenum 24 which it completely fills. The continued flow of the combustible gas into the plenum 24 displaces the gas that is within the plenum 24, causing it to flow outwardly through the apertures 46 in the peripheral wall 42 of the lower burner section 26. Here the gas is ignited to form a self-sustaining flame at each of the apertures 46. Since the burner 2 possesses an elongated configuration, some of the apertures 46 in the peripheral wall 42 of the lower section 22 are much closer to the stub tube 26 than other apertures 46. Even so the combustible gas is distributed generally uniformly to all of the apertures 46, this being due to the presence of the arcuate segments 60 which are presented toward the nearby apertures 46 to form baffles that prevent the incoming combustible gas from flowing directly to those apertures. Instead, the gas must follow a somewhat circuitous path to reach the nearby apertures 46. The end result is that the gas pressure at all of the apertures 46 is about the same so the flame is generally uniform around the burner 2.

Figure 6:
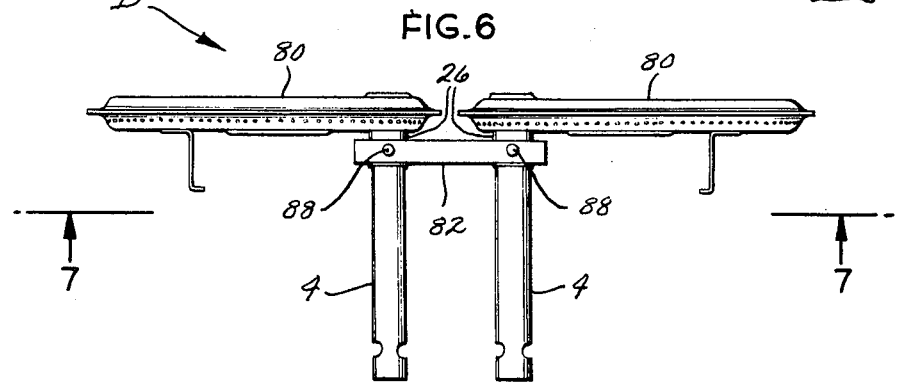
FIG. 6 is a side elevational view of a modified burner assembly having two burners that are held together by a pair of brackets.
Figure 7:
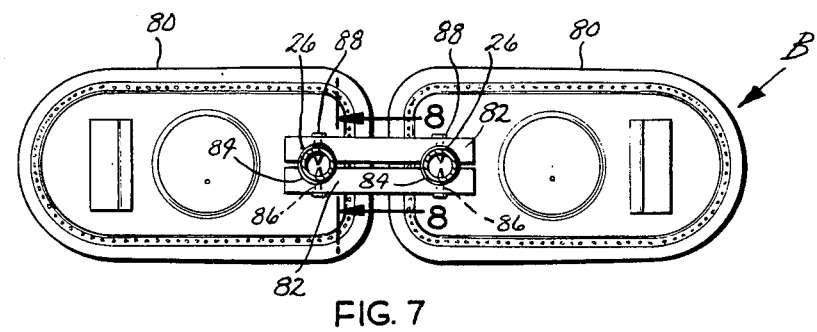
FIG. 7 is a bottom plan view of the modified burner assembly taken along line 7—7 of FIG. 6.

Some outdoor cooking grills utilize two burners, and with these grills it is desirable to tie the two burners together so that they may be installed in or removed from the grill housing as a single unit. A modified burner assembly B (FIGS. 6-9) provides this capability The modified burner assembly B has two burners 80 (FIGS. 6 and 7) each of which is essentially the same as the burner 2, except that each has its stub tube 26 located near the ends of its upper and lower sections 20 and 22. Extending between the stub tubes 26 of the two burners 80 are connecting brackets 82 of channel-shaped configuration. The side walls of each bracket 82 are cut away to provide pairs of arcuate reliefs 84 (FIG. 7) and the web between the arcuate reliefs is provided with a screw hole 86. The reliefs 84 have a radius generally equal to the radius of the stub tubes 26 on the burners 80, and this enables the connecting brackets 82 to be fitted partially around the stub tubes 26 at the arcuate reliefs 84. When so disposed, the holes 86 in the webs of the brackets 82 align with the screw holes 16 and 66 in the mixer tubes 4 and the stub tubes 66. Extended through the aligned holes 86 and 16 and threaded into the holes 16 of the two mixer tubes 4 are sheet metal screws 88 which in effect clamp the burners 80 to the connecting brackets 82 so that the connecting brackets 82 unitize the two burners 80 and their respective mixing tubes 4 into the single burner assembly B.

The stub tube 26 of the burner 2 and the mixer tube 10 may be joined together by means other than the sheet metal screws 68. For example, the tapered portion 64 of the stub tubes 26 may be provided with an annular depression or indentation 90 which receives a detent 92 in the form of a dimple or annular head on the tapered portion 10 of the mixer tube 4. The indentation 90 and detent 92 enable the burner 2 and mixer tube 4 to be merely snapped together.

The tapered fit between the burner 2 and the mixer tube 4, that is the snug fit between the tapered section 64 or the stub tube 26 of the burner 2 and the tapered end portion 10 or the mixer tube 4, eliminates the need for gaskets between the burner 2 and the tube 4. The asbestos gaskets of conventional burner assemblies not only increase the cost of such assemblies, but present somewhat a safety hazard. In this regard, the gasket material is sometimes jammed by the sheet metal screws and the stamped metal burners have been known to destort sufficiently under the high temperatures to draw away from their gaskets. In either case the combustible mixture may escape and ignite at the wrong location in the cooking grill.

The combination of the mixer tube 4 and stub tube 26 is such that it may be used for a variety of gas burner configurations in a range of sizes suitable to the mixer tube's ability to flow sufficient gas/air mixture.

In some instances it has been beneficial to the various gas distribution patterns to enhance the mixing characteristics of the mixer tube 4 by embossing or forming helical ribs into the tube sidewall, that extend axially along the length of the tube between the gas entry orifice and the tapered portion 10.

An alternate embossed pattern consists of a series of pheripheral corrugations or "ripples" approximately one to two metal thicknesses in depth along a length of the mixer tube 4 between either end.

This invention is intended to cover all changes and modifications of the example of the invention herein chosen for purposes of the disclosure which do not constitute departures from the spirit and scope of the invention.

What is claimed is:

1. A burner comprising: first and second burner sections which are joined firmly together and enclose a plenum, at least one of the sections having apertures that open out of the plenum to the surrounding atmosphere, the first section having a wall and the second section having another wall, with the two walls being spaced apart and presented opposite to each other; and a tube extended through the wall of the first section and also through the plenum and having one end abutting the inwardly presented surface of the wall of the second section, the tube having at least one tab projecting outwardly from that portion of the tube that is within the plenum for interfering with the inwardly presented surface of the wall of the first section and thereby preventing the tube from being withdrawn from the plenum, the portion of the tube that is within the plenum further having at least one opening which places the interior of the tube and the plenum in communication, the tab being derived from the wall of the tube and spread outwardly therefrom and the opening being at the portion of the tube wall formerly occupied by the tab, the tube having another end that is accessible at the exterior of the burner, whereby a combustible gas that is introduced into the tube through its other end will flow into the plenum through the opening in the tube and thence out of the plenum through the apertures in at least one of the plenum sections, beyond which it may be burned.

2. The burner according to claim 1 wherein the tube projects outwardly from the first section and away from the plenum, with the outwardly projecting portion being tapered.

3. A burner assembly comprising the burner of claim 2 and a mixing tube that is tapered to accommodate the taper on the burner tube, the mixing tube being connected to the burner tube for directing a combustible gas to the burner tube.

4. The burner assembly according to claim 3 wherein the taper of the burner tube is such that it is largest at its accessible end, and the taper of the mixer tube is such that the tube is smallest at the end that connects with the burner tube, and wherein the tapered end of the mixer tube fits snugly into the tapered end of the burner tube.

5. The burner assembly according to claim 4 and further comprising at least one screw extended laterally through the tapered end of the burner tube and threaded into the tapered end of the mixer tube.

6. A burner according to claim 1 wherein the wall of the second section is contoured to mate with said one end of the tube such that said one end of the tube is prevented from shifting laterally with respect to the second section.

7. A burner according to claim 1 wherein the opening in the tube extends all the way to the end of the tube that abuts the wall of the second section, so that the tube has a tube segment along the opening; wherein the burner sections are configured such that some of its apertures are closer to the tube than others of its apertures; and wherein the tube segment is presented toward the apertures that are located closest to the tube, so that the tube segment serves as a baffle for preventing the combustible gas from being directed at the closest apertures as the gas flows from the tube into the plenum.

8. A burner comprising: first and second burner sections which are joined together to enclose a plenum for containing a combustible gas, at least one of the sections having apertures that open from the plenum to the surrounding atmosphere for allowing the combustible gas to escape where it can be burned in the surrounding atmosphere, the first section having a first wall that is provided with a hole, and the second section having a second wall that is located opposite the first wall and is provided with a recess that is located opposite to and opens toward the hole in the first wall, a tube extended through the hole in the first wall such that a portion of the tube is within the plenum and another portion is projected away from the outwardly presented surface on the first wall, the portion of the tube that is within the plenum having segments that extend into and fit tightly within the recess of the second wall s the tube is confined laterally by the recess and the hole, the portion of the tube that is within the plenum having additional segments that are bent outwardly from the axis of the tube to provide openings and laterally directed tabs, with the tabs overlying the inwardly presented surface of the first wall so that the tube is captured between the first and second walls, whereby combustible gas that is introduced into the tube will flow through the openings and into the plenum, from which it escapes through the apertures.

9. The burner according to claim 8 wherein the portion of the tube that projects outwardly from the first wall is tapered, flaring outwardly away from the first wall.

10. The burner according to claim 8 wherein the first and second walls are generally parallel and each of the sections has a peripheral wall, the sections being joined together along their peripheral walls and the apertures being in at least one of the peripheral walls.

11. The burner according to claim 8 wherein some of the apertures through which the combustible gas escapes are nearer to the tube than others of the apertures; and wherein the segments of the tube that extend into the recess of the second wall are presented toward the apertures that are closest to the tube so that the segments serve as baffles for preventing an excessive amount of gas from being diverted to those nearby apertures.

12. A burner assembly comprising the burner of claim 9 and a mixer tube having an inwardly tapered end that fits into the tapered outwardly projecting portion of the tube on the burner.

13. The burner assembly according to claim 12 and further comprising at least one screw extended through the tapered portion of the tube on the burner and threaded into the tapered portion of the mixer tube.

14. A burner comprising: walls which enclose a plenum for containing a combustible gas and including first and second walls that are located opposite to each other such that their inwardly presented faces are presented toward each other and a peripheral wall located between the first and second walls and being generally along the periphery of the burner, the peripheral wall containing apertures that open out of the plenum to the surrounding atmosphere so that gas may escape from the plenum to be burned; and a tube projecting through the first wall and into the plenum so that a portion of the tube is within the plenum, the location of the tube relative to the peripheral wall being such that some of the apertures in the peripheral wall are closer to the tube than others of the apertures, the portion of the tube that is within the plenum being cut away to provide openings through which the interior of the tube communicates with the plenum, and leaving tube segments which are located between the openings, the tube segments being presented toward the apertures that are closest to the tube so that a combustible gas flowing into the plenum from the tube will not flow directly to the apertures that are closest to the tube, the tube having an end that is accessible at the exterior of the burner so that a combustible gas may be introduced into the tube through its accessible end and then directed through the tube to the plenum.

* * * * *